June 2, 1936.   C. A. P. TURNER   2,042,973
MAKE-UP OF BRIDGE MEMBERS
Filed Aug. 5, 1933   5 Sheets-Sheet 1

INVENTOR.

June 2, 1936.   C. A. P. TURNER   2,042,973
MAKE-UP OF BRIDGE MEMBERS
Filed Aug. 5, 1933    5 Sheets-Sheet 2
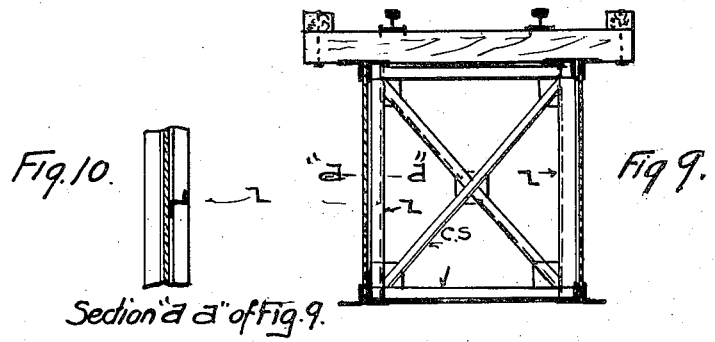
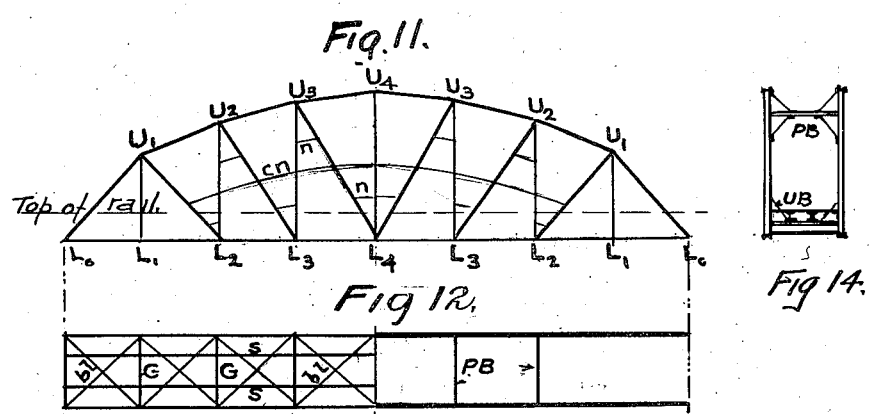
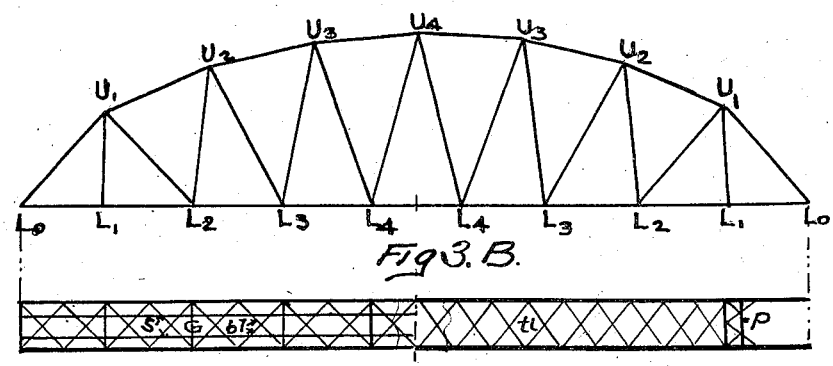
INVENTOR.

June 2, 1936.   C. A. P. TURNER   2,042,973
MAKE-UP OF BRIDGE MEMBERS
Filed Aug. 5, 1933    5 Sheets-Sheet 3
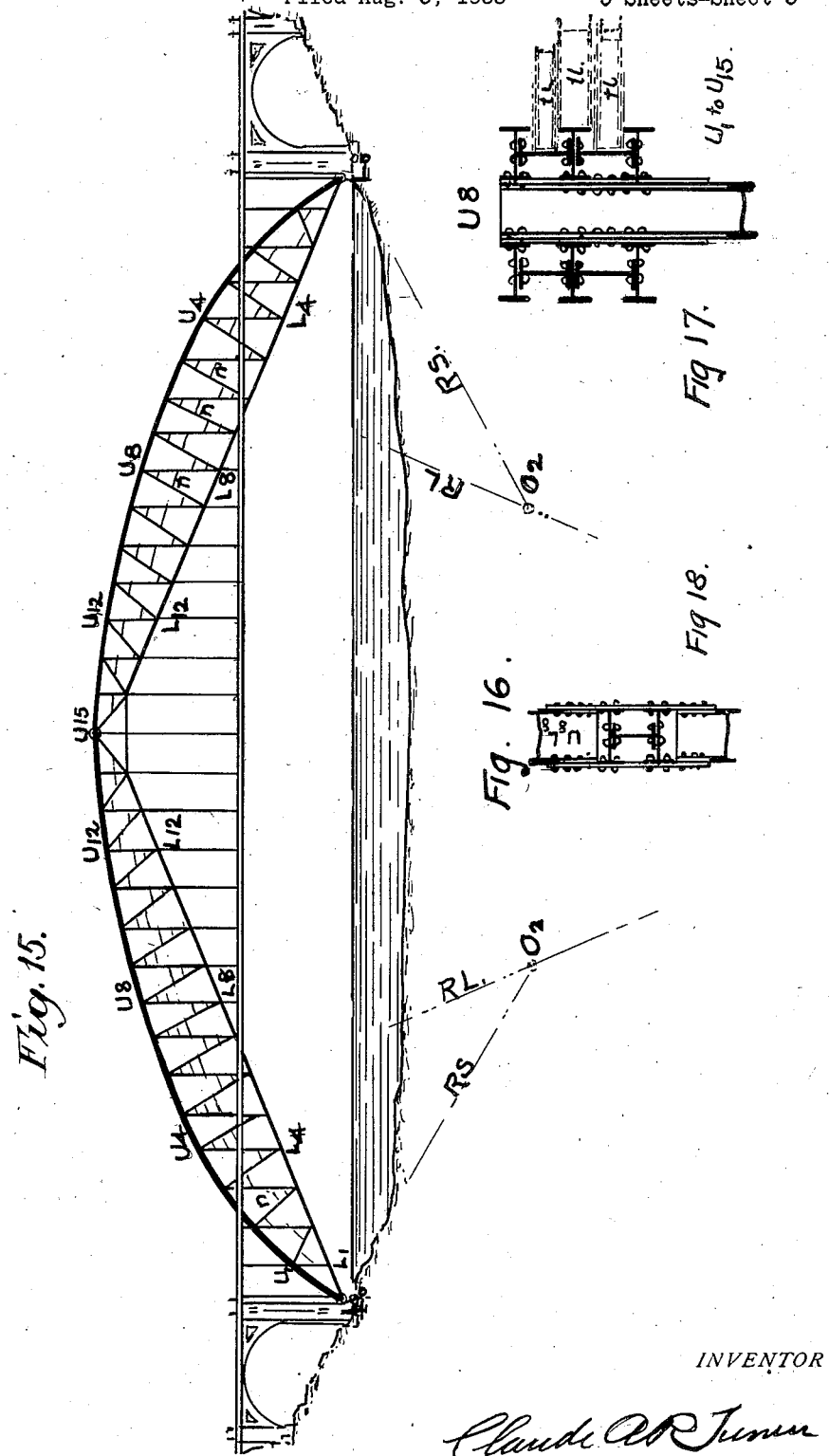
INVENTOR
Claude A. P. Turner June 2, 1936.  C. A. P. TURNER  2,042,973
MAKE-UP OF BRIDGE MEMBERS
Filed Aug. 5, 1933  5 Sheets-Sheet 4
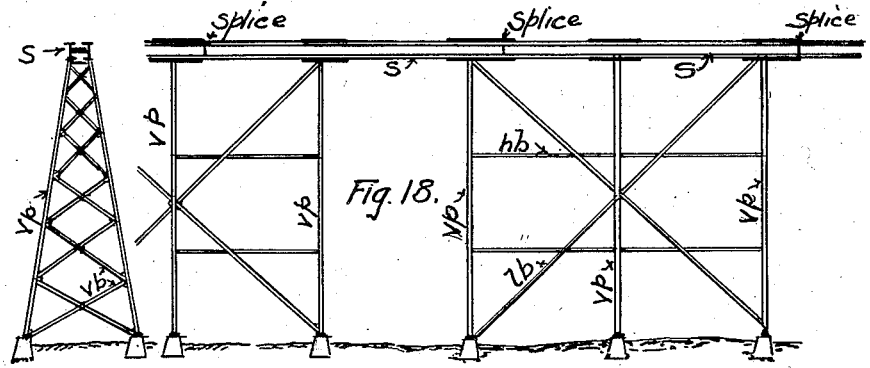
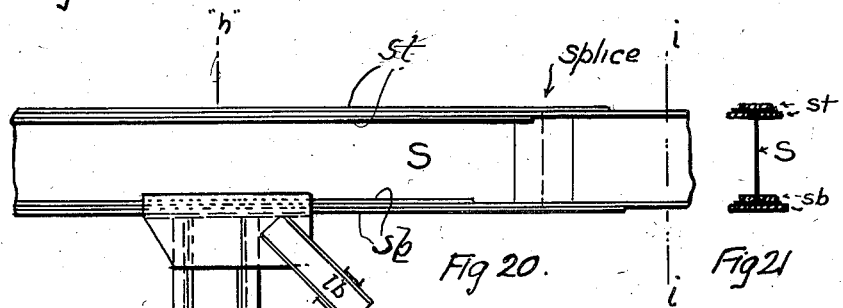
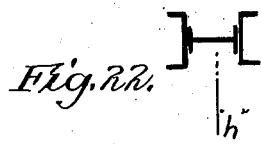
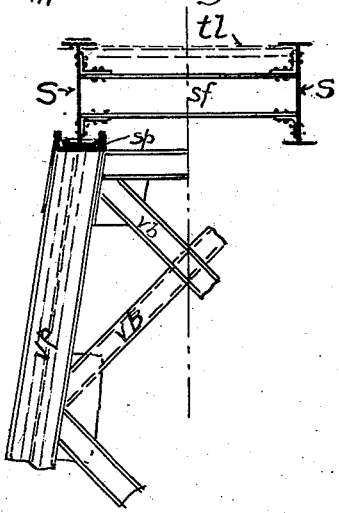
INVENTOR.

June 2, 1936. C. A. P. TURNER 2,042,973
MAKE-UP OF BRIDGE MEMBERS
Filed Aug. 5, 1933 5 Sheets-Sheet 5

INVENTOR.

Patented June 2, 1936

2,042,973

UNITED STATES PATENT OFFICE 2,042,973

MAKE-UP OF BRIDGE MEMBERS

Claude A. P. Turner, Minneapolis, Minn.

Application August 5, 1933, Serial No. 683,913

8 Claims. (Cl. 14—13)

A large reduction in the cost of rustproofing is effected by a radical simplification of the surfaces to be coated and a large reduction of the area of these surfaces under that of customary design is accomplished as outlined in the accompanying drawings.

Figs. 1, 3, 11 are side elevations on a small scale of the steel bridge embodied in my invention;

Figs. 2, 12, and 3B are top plan views of the floorings and top lateral systems shown end to end;

Figs. 11, 12, 14 are respectively illustrations of an embodiment of my invention in spans under 170 ft. for railroad purposes;

Fig. 15 is a side elevation of another embodiment of my invention suitable for arch bridges of long span;

Figs. 16 and 17 are views of structural details thereof;

Figure 24:
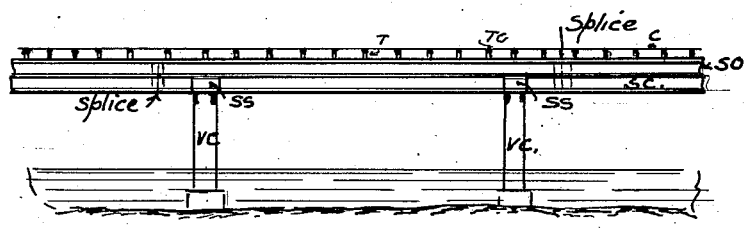
Figure 25:
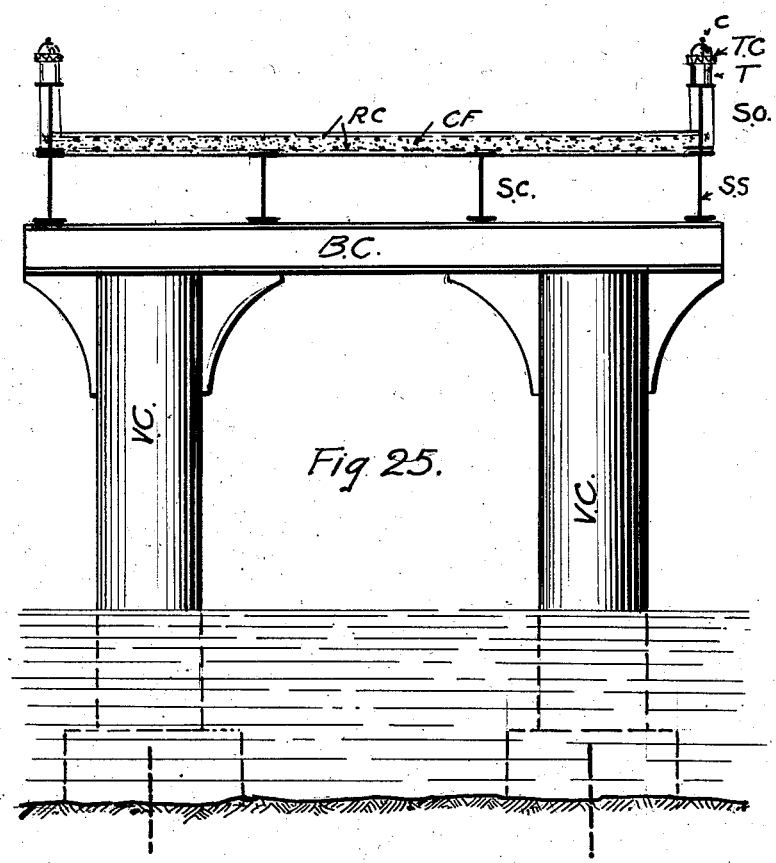

Figs. 18, 19, and 20 are, respectively, side elevations and cross sections of a railway trestle embodying my invention;

Figs. 21 to 23 are, respectively, detail views of the structural elements thereof;

Fig. 24 is a side elevation of a highway viaduct embodying my invention;

Fig. 25 is a cross section thereof with one of the columns broken away and shown in cross section.

In nearly all forms of truss frame prior to my invention web members were made up of latticed channels of different sections while in the pin connected bridge a multiplicity of I bars has been employed for the bottom chords and web diagonals. In the Tudor arch the web members are of uniform size, of broad, flange-rolled beams without lacing, thus eliminating expensive shop work and troublesome surfaces for cleaning. I thus reduce the area to be rust proofed to three-eighths that which would result from customary designs. Elimination of latticing is attained by normally bracing at intervals each web member from its nearest adjacent web member toward the center in the upper half of the truss and toward the end in the lower half or vice versa.

Not only is my improved truss novel in the manner of "breaking the length" or staying long web members but it differs from customary construction in that the weight of all chord members is supported from the panel points only, avoiding the sub-struts of the Baltimore or Petit type, Warren, with sub-verticals, etc. All web members are full length, i. e., unbroken by truss joints between chords, rendering the frame single intersection with panels toward mid span differing widely in form from the prior art in that the height relative to their length far exceeds customary practice.

In ordinary practice the truss (inherently a combination of triangular frames) is made up of primary triangles in Pratt web systems varying within small limits from forty-five degrees right triangles which as the span and depth increase are broken by sub-divisions or secondary triangulations, which I avoid. Where Warren web systems have been employed in like manner, wide variation from the equilateral triangular element has been avoided by subdivision, and this I avoid in my odd panel truss shown in elevation, Fig. 3B, in which the triangles vary from approximately 45° right triangles at the end to triangles having an acute angle with a natural tangent as small as one quarter in a simple span as long as seven hundred feet.

The pointed arch form is higher at the crown and lower at the hip than ordinary trusses thus securing greater effective depth without increasing the overturning effect of wind, and permitting the chords by their inclination to carry the major portion of the vertical shear. In even panel trusses the truss has a vertical and an inclined web member at each panel point and the inclined members under uniform load act as hangers transferring the weight to the arched chord while the verticals, except the hip and center vertical which are in tension, carry either relatively negligible compression or may be in tension. The stress in and weight of the web is by this action greatly reduced while the extra height at the center reduces the section of the chords and increases the stiffness of this truss. The bottom chords are single H-beams for single track railway spans of two hundred feet in double or triple panel lengths. Thus multiplicity of I bars and pins of the prior art is avoided and shop work reduced to mere drilling the holes required for the joint connections, without detail material between joints, such as the customary lacing or battens of ordinary riveted work.

The top chords I prefer to make of H form of three I-beams, one vertical and two horizontal as this requires no latticing and reduces the surface to be cleaned and plated to the minimum. I prefer to make the form of the pointed arch such that the stress will be uniform thruout the top chord thus simplifying joints and shop work.

The Tudor arch form of chord is advantageous not only for a through truss but for a deck arch or half through arch. For spans under about one hundred sixty feet for single track railroad bridges, the height required at the portal interferes with its development and the pony truss is found preferable with verticals braced to floor beam, top laterals eliminated and sway frame (PB Fig. 14) bracing the higher portions, thus carrying out the pointed arch form of chord.

The economic panel length for the railway truss spans of 180 feet and up is double the proper panel length for the lateral system so that the lateral panels are made half as long as the truss panels and the stiff rolled chords permit lateral system connections to be made at intermediate points and maximum lateral stiffness is secured by approximately 45° laterals in place of flatter angular intersections in common use.

The floor system is novel in that all stringers are made continuous and the end panels are shortened for equalization of moments. The top flange is spliced by three splice bars, two on the under side of the flange and one on top, so that they may be riveted through the flange and the rivets will act in double shear and with bars of such widths that two steps at each side will be formed along the splice to be welded on both sides, forming an echelon weld in conjunction with the rivets in double shear. In the floor beam I take advantage, in railroad structures, of the additional height from the bottom of the tie to the underside of the rail and prefer to make the top of the floor beams eight to eight and one half inches above the top of the stringers and cut through the web for the splice bars of the stringers above described.

Present practice in plate girder design is to stiffen the web by angles and fillers riveted to the sides of the web, presenting a broken surface both on the outside and inside of the web of the girder. I substitute a single Z bar on the inner face in place of the angle and block out the flange of the Z where it passes the flange angle and thus eliminate fillers while securing greater stiffening effect with less metal. In addition to this advantage one face of the girder web is plane facilitating cleaning for coating or plating and improving its appearance.

The elements of my invention embodied in a unitary structure, such as a bridge, obviously cooperate in attaining an economic result as has already been noted exemplified by increased stiffness, reduction of weight and cost of shop work.

In my highway spans such as sixty to eighty feet, twenty two feet roadway, four 36 inch beams are used as carrying girders, and the outside beam raised so that the top of the bottom flange will be level with the top flange of the inner girders, and the reinforced concrete floor rests on the inner flange of the outer girder on top of the inner girders. The outer girders then form a parapet about 28 inches high above the concrete floor. The silver like cadmium plating of the girder is attractive. Desirable additional height of railing is secured by placing vertically on top of the girder and along its length, ten inch diameter tile, 12 inches high, spaced above five feet centers which are filled with concrete and anchored by bolts into the top flange of the girder. These posts are capped with ornamental terra cotta caps in polychrome Egyptian colors and their caps are connected by ¾ inch road cable. This combination makes a railing that is attractive in looks.

Figure 1:
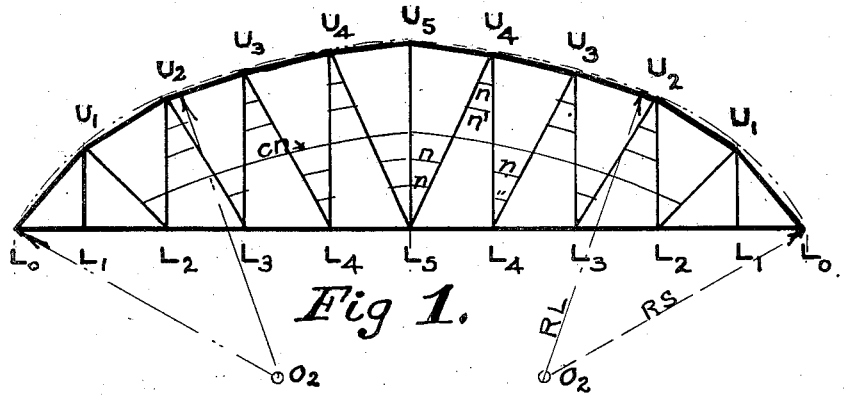

Fig. 1 represents a pointed truss of my type of ten panels in which the panel points are lettered $L_0$, $L_1$, $L_2$, $L_3$, $L_4$, $L_5$ for the lower or bottom chord and $U_1$, $U_2$, $U_3$, $U_4$, $U_5$ for the upper or top chord. The four centers to which the outline was drawn are $O_1$ long radius marked RL on the drawings are $O_2$, $O_2$ short radius marked RS on the drawings. Fig. 1B represents in like manner an odd panel truss of nine panels.

Figures 4, 5:
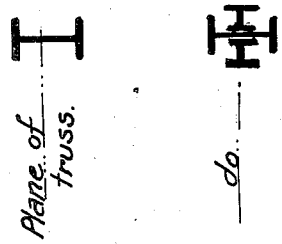
Fig. 4 is a cross-section of the verticals and diagonals of the single intersection Pratt type webbing of Fig. 1.
Fig. 5 is a cross section of the bottom chord medium weight.
Figure 6:
Fig. 6 is a cross section of the top and bottom chord, long spans.

In the elevation of this even panel truss the webbing is of the single intersection Pratt type. Each web member, $U_1 L_1$, $U_2 L_2$ (verticals) and $U_1 L_2$, $U_2 L_3$ (diagonals) are both made of rolled I-beams of the section shown in Fig. 4 of a uniform depth throughout the length of the truss. They are stayed centrally by the tie $cn$ and by the braces $n$ which I would make of two channels connecting the flanges of adjacent web members as shown in Fig. 5. The cross sections of the top chord are shown in Fig. 6 consisting of two I-beams in horizontal position of the same depth as the web members and a vertical I beam, forming a section that has rigidity in compression vertically and horizontally, without lacing and with an open section readily mechanically cleaned for electroplating. The bottom chord for trusses up to two hundred feet in span would be made of the general cross section of Fig. 4 for 300 or 350 ft. single track spans of the cross section Fig. 5, three I-beams, while for 700 ft. spans the bottom chord section would be made of three I-beams as in Fig. 6.

Figure 2:
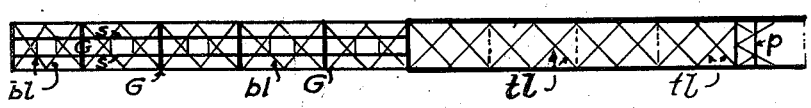

Fig. 2 shows one half the flooring, the stringers being marked S, the lateral bracing $bl$ and the floor beams G. It will be noted that as the bottom chord is a rigid section, the lateral panels are half the length of the truss panels and connected with the chord midway of the floor beams. By this arrangement the most efficient angle for the lateral system is secured.

Fig. 3 shows in plan half the top lateral system in which the lateral struts are marked $tl$ and the portal $p$. As in the bottom lateral system the lateral panels are half the length of the truss panels giving efficient angle for the lateral struts which I prefer, for stiffness, to make of broad flange beams for both top laterals and bottom laterals.

Figure 7:
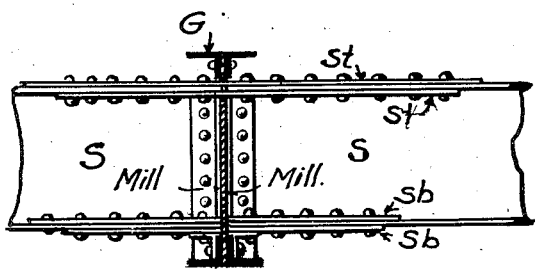
Fig. 7 is a cross section of a floor beam with a side elevation of a floor stringer.

Fig. 7 shows in cross section a floor beam G and a side elevation of the stringers S, and their connection to the floor beam. To secure greater stiffness and economy, I make the stringers continuous. This is effected as follows: The stringers are milled to exact length with the added flange bars $sb$ riveted and welded thereto and the connection angles are milled at the same time. The top flange splice bars $st$ cannot be attached to the stringers before erection but after the stringers are placed in position they are passed through a hole cut in the web of the floor beam G and riveted through the flange of the stringers S and welded along the ledges provided by the extension of the lower bars beyond the flange and the top bar narrower than the flange so that the step welds can be more readily made working from above. By this means triple the strength and five times the stiffness of the stringers are secured over that of ordinary practice which lack continuity.

In applying the principle of the pointed arch for spans of from 180 to 350 feet a harmonic system is secured whether even panels with Pratt type webbing or odd panels with Warren webbing are used, thereby enabling substantially the same floor system by alternation of odd and even panels consecutively with spans of increasing length. The broad principle involved is that of a sufficiently arched top chord to render the maximum web stresses of such substantial uniformity that all web members may be made of beams of nominally constant depth.

With spans exceeding 350 feet even panels are to be preferred as top chord sections for the even panel truss are shorter, the sway system is vertical and beam connections to the vertical posts are uniform.

In Figs. 11 to 14 is shown the application of my invention to spans under 170 ft. for railroad purposes, for which the Tudor arch form is followed by making the height of the truss at the hip $U_1$ much lower than required for portal clearance of a through truss. The splices are lettered as in Fig. 1 with the web stays, as before, marked $n$. Top chord, bottom chord and web may be made up of rolled broad flange I-beam sections. The divergence from the floor arrangement of the through truss lies in U-brace UB, Fig. 14, and intermediate sway braces PB in the higher panels which connect to the vertical I-beam posts and braces them rigidly in a vertical position. Top lateral bearing other than sways PB is omitted. The stringers for trusses of this kind I prefer to make of two lengths only splicing at midspan, and position the stringers on top of the rolled floor beam G instead of framing continuously through the floor beam as in case of the truss of Fig. 1.

In Figs. 9 and 10, I show a cross section of a plate girder suitable for single track railroad spans up to 100 ft. In Fig. 9 it will be seen that the rails cause a bending of the tie such that the flange needs stiffening support on the inside and not at all on the outside. I effect this needed stiffening by the use of the Z-bar marked Z (section on line $a$—$a$, Fig. 10). This method of stiffening leaves the outside face of the web of the girder PG plain, simplifying the work of cleaning for electro-plating and improving its appearance.

Figure 8:
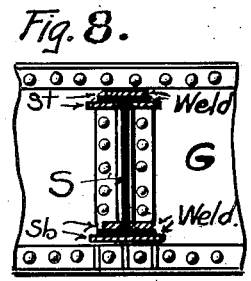
Fig. 8 is a cross section of the stringer.

Figs. 19 and 23 show my invention as applied to a railway trestle. The novelty consists in bracing transverse bent $vp$ (Fig. 20) in triplets instead of pairs. This increases the longitudinal stiffness three-fold. The stringers I make continuous by doubling the cross section of the flange over the columns $vp$ in a manner similar to the continuity of stringers S Figs. 7 and 8.

By thus doubling the cross section by bars at $st$ and $sb$ Figs. 21 and 22, the moment at midspan is one fourth that of the usual simple beam and over the supports three fourths, under uniform loading, increasing under partial load to one third between supports and decreasing to five eights over the supports under extreme conditions. The stringers are preferably made in two panel lengths and spliced at the quarter points as so marked in Figs. 19 and 20. Minimum areas for cleaning and coating electrolytically are thus secured by the rolled section of stringers S and the open H section of column $vp$, Figs. 21 and 22.

As in the truss of Fig. 1, I make the end span of the trestle about seven tenths of the uniform interior spans for the equilization of maximum end and interior moments in the stringers. Expansion of the stringers S is provided by riveting them solidly to the central braced bent and allowing them to slide on a bronze plate $sp$ in the trough shown at the top of the column $vp$ Fig. 23. Fig. 23 includes a half section of a span intermediate between bents with brace $sf$ tying the stringers together and the top flange beam $tl$ which is of the ordinary kind. This trestle differs from customary practice in uniformity of spans in place of alternate short braced bents and a longer girder span between, such as a 30 ft. braced bent and sixty ft. girders, etc., and because of the uniform continuous stringer spans and wider braced bents less weight is required and greater stiffness secured.

The bracing of Fig. 18 consisting of diagonal member $lb$ with horizontal member $hb$ intersecting the diagonals at an intermediate point stiffens the posts $vp$ at the third points of the $lb$ intersections, and is an economic form utilized advantageously in sway and portal bracing.

Fig. 24 shows in a side elevation my highway viaduct in which VC represents reinforced concrete columns, SC the intermediate stringers, SO the outside stringers, TC the terra cotta caps and T the tile posts that are placed on top of SO. SS represents short blocks of I-beam which support the outside stringers above the bearing beams of the concrete bent marked BC, Fig. 25.

In Fig. 25 the cross section of the column shows the reinforcement formed of vertical bars RC and the reinforcing bars RC in the floor of reinforced concrete CF on top of the longitudinal beams. I prefer to make the reinforcement of double mat top and bottom bars, the top bars being tied through the girders SO. I represents the tile posts on top of the stringers SO, TC the ornamental terra cotta caps and C the longitudinal road cable.

It will be noted that there is nothing to interfere with moving the concrete forms supported by the under flanges of intermediate stringers SC and the stringer support SS being a short section of beam to which I attach temporarily longitudinal beams that furnish the same convenience in moving forms that is afforded by the central stringers. This arrangement permits great reduction in cost of the form work and a reduction in the cost of building up the railing because the outside stringers SO form the major portion of the rail and besides give it the artistic appearance from the silver like cadmium plating.

The above disclosed process of rendering steel structures rustproof by the use of cadmium is not herein specifically claimed, but will be made the subject matter of a divisional application.

What I claim as new and desire to secure by Letters Patent is:

1. In a railroad trestle with supporting columns the combination of equal interior spans, stringers mechanically continuous with flange sections increased over the supporting columns, said stringers being spliced at the points of inflection in double panel lengths, bents including a central braced bent attachment between the stringers and the central braced bent, and a sliding expansion connection over bents between the center and the end.

2. In long span arch construction the combination of a compression chord member made in two longitudinal halves each of five heavy rolled broad beam sections, web members of single broad flange beams connecting the halves of said compression member, a bottom chord of the same width as the normal depth of the web beams made of two beams normal and one beam parallel to the plane of the truss, and stays for the unsupported length of the web members consisting of braces at intervals normal thereto for the reduction in weight and rustproofing.

3. The combination in a single intersection thru truss of a top chord consisting of segments in arched formation, the respective segments being so inclined that their resistance to shear renders the necessary cross section of the web members substantially uniform so that wide flanged beams of the same nominal depth may serve for all members when braced by a series of stays extending from one web member to the next nearest web member substantially as shown and for the purpose set forth.

4. In a thru simple camel back truss a web system consisting of verticals at panel points and diagonals sloping downward toward the center completing the triangulation with top chord segments in arched formation, the inclination of the respective segments permitting substantial uniformity in the cross section of the web members when stiffened by a suitably spaced series of stays from one web member to the nearest adjacent member, the most economic inclination of the top chord segments being such that uniform load is transferred from the floor to the arched chord thru the diagonals except where the verticals are natural hangers, the stress in other verticals being zero for uniform load only.

5. The combination in a thru truss bridge as specified in claim 4 of interior panels of the same length and end panels shortened to substantially eight-tenths of the length of the interior panels, combined with stringers rendered mechanically continuous by suitable increase in the compression flange at the bottom and splicing of the tension flange at the top as an element effecting reduction in weight of both floor and truss.

6. In a truss frame, a single intersection web system consisting of I sections, the webs of which are normal to the plane of the truss and the flanges stiffened by multiple stays in series from one web member to the next nearest member above and below the center of depth between the top and bottom chords, substantially as shown.

7. In a highway bridge flooring comprising continuous stringers resting on top of supporting beams or piers, a reinforced floor supported on the upper flanges of inner stringers and on the inner lower flange of the outside stringers the combination of stays within the concrete positioning the outer stringers, of short longitudinal beam supports fixing the height of the outer stringers and means of attaching temporary track beams thereto forming a continuous longitudinal runway for movable centering.

8. In a railroad deck girder the combination with each girder web of spaced Z bar stiffeners riveted to the inner side of the web, the inner flange of the Z being blocked out to fit over the chord angles and welded thereto for the purpose set forth.

CLAUDE A. P. TURNER.